United States Patent [19]
Togawa

[11] Patent Number: 5,325,289
[45] Date of Patent: Jun. 28, 1994

[54] OPERATING SYSTEM FOR UNIPLANAR TRANSLATION OF MICROMANIPULATOR INSTRUMENTS

[75] Inventor: Yoshiyuki Togawa, Osaka, Japan

[73] Assignee: Shimadzu Corporation, Kyoto, Japan

[21] Appl. No.: 83,937

[22] Filed: Jun. 28, 1993

[30] Foreign Application Priority Data

Jun. 29, 1992 [JP] Japan ................................. 4-170816

[51] Int. Cl.$^5$ ...................... G06F 15/46; G05B 19/18
[52] U.S. Cl. ........................... 364/167.01; 364/474.28; 364/188; 364/474.22
[58] Field of Search ............... 318/572, 571, 570, 568, 318/573; 364/167.01, 188, 191, 474.24, 474.28, 474.29; 414/742, 775; 901/4, 6, 15, 47, 42

[56] References Cited

U.S. PATENT DOCUMENTS

| | | | |
|---|---|---|---|
| 4,477,754 | 10/1984 | Roch et al. | 318/568 |
| 4,507,738 | 3/1985 | Nozawa et al. | 318/568 |
| 4,572,998 | 2/1986 | Nozawa et al. | 318/572 |
| 4,590,577 | 5/1986 | Nio et al. | 901/42 |
| 4,744,039 | 5/1988 | Suzuki et al. | 901/47 |
| 4,835,362 | 5/1989 | Nakashima | 901/42 |
| 4,907,164 | 3/1990 | Guyder | 364/474.29 |
| 4,922,431 | 5/1990 | Carter, II | 364/474.29 |
| 4,967,125 | 10/1990 | Hara | 318/572 |
| 5,070,464 | 12/1991 | Seki et al. | 364/474.29 |

*Primary Examiner*—Long T. Nguyen
*Assistant Examiner*—Jim Trammell
*Attorney, Agent, or Firm*—Nikaido, Marmelstein, Murray & Oram

[57] ABSTRACT

In micromanipulator apparatus having fine instrument mechanism translation drivers movable along three axes within a defined space, an operating system directing uniplanar movement of the translation drivers. The system is realized in operating apparatus including a mouse as an operational data input device which, via an analogue movement thereof generating drive data, directs a correspondingly mapped uniplanar movement of the fine instrument translation drivers concerning two of the three axes, in an actual selection from a repeating sequence of dual combinations via a click button of the mouse. A controller, accordingly responsive to the drive and axes selection data input from the mouse, commands, via output to the translation drivers, movement in a plane through the two axes actually in selection. Thus operational movement and data input via the mouse effect constantly uniplanar translation of the fine instrument mechanisms, the plane of translation being continuously switchable among three planes of movement. Stable operative control of complicated micromanipulator movements, especially in micrometer increments, is furthermore enabled to be single-handed, such that two micromanipulating fine instrument mechanisms can be operated by an operator using both hands to handle the pair of corresponding mouse devices.

17 Claims, 5 Drawing Sheets

OPERATING SYSTEM FOR UNIPLANAR TRANSLATION OF MICROMANIPULATOR INSTRUMENTS

BACKGROUND OF THE INVENTION

1. Technical Field

The present invention relates to fine instrument movement in micromanipulator apparatus and, more specifically, it relates to an operating system and operation apparatus directing uniplanar movement of fine instrument mechanisms movable along three axes within a defined space by corresponding drivers.

2. Description of the Background

An exemplary micromanipulator is equipped with a fine needle instrument in an independently movable mechanism, opposed to which is a holding needle instrument in a separate independently movable mechanism, in conventional use for the injection of DNA solution into a cell. The micromanipulator is thus used to perform a given treatment on a microscopic object such as a cell, placed for example in a Petri dish, by manipulating the minute appliances such as the fine needle or holding needle instruments within the field of a microscope.

One operating system for such a micromanipulator comprises a Z-axis (vertical) control stick pivotal upward and downward, and an X-Y axis (horizontal) control stick pivotal back and forth and from side to side, wherein with one control stick in each of an operator's hands, a given minute appliance is manipulated three-dimensionally. In addition, there are micromanipulator systems operable by one hand, one of which comprises a dial for controlling movement in the Z-axis direction provided on the tip of a control stick pivotal both back and forth and from side to side, and another comprising three dials for controlling movement in the three axial directions provided on a fixed stick; thus the minute appliance is movable three-dimensionally through single-handed control movements.

Wherein the manipulator system is operated with both hands, the two opposed micromanipulator fine instrument mechanisms cannot be operated simultaneously by a single operator. Moreover, wherein the manipulator system is controlled with one hand, it is difficult to operate the system to bring about a uniplanar curved or straight movement of either of the minute appliances. Particularly, when the micromanipulator is to be operated in the directions of the Z-X axes or of the Z-Y axes at the same time, an operator must move the control stick back and forth or from side to side meanwhile turning the Z-axis control dial, or turn the X- or Y-axis control dials meanwhile turning the Z-axis control dial as the case may be, requiring a high level of manipulating skill. For example, wherein a cell is to be pricked with the fine needle from above at an angle and then lifted upward at an angle, it is difficult to manipulate the movement with one hand.

Therein, movement of the minute appliance, especially in micrometer increments, is more stably effected if the driven movement is restricted to be within a single plane as defined by two of the three possible axes of motion.

SUMMARY OF THE INVENTION

An object of the present invention is to improve operability of a micromanipulator.

A further object of the invention is enable single-handed operative control of a fine instrument mechanism in a micromanipulator.

Still another object is to effect constantly uniplanar movement of the fine instrument mechanism, continuously switchable among three planes of movement defined by three axes along which the fine instrument is driven in the micromanipulator.

An operating apparatus and associated operating system according to the present invention operates a micromanipulator comprising fine instrument movement means movable along three axes within a defined space. The operating apparatus effective of the operating system includes operational data input means, axes selection means, and movement command means. The operational data input means directs uniplanar movement of the movement means concerning two axes actually in selection from the three axes of motion. The axes selection means selects the two axes which thereby define the actual uniplanar movement. The movement command means, responsive to both the operational data input means and to the axes selection means, commands movement in a single plane through the two axes in actual selection, via output to the movement means.

Thus the operating apparatus and associated operating system effect constantly uniplanar movement of the micromanipulator fine instrument mechanism or like minute appliance, meanwhile the plane of movement being continuously switchable among three planes as defined by the three axes of motion. Therefore, movement of the minute appliance, especially in micrometer increments, is more stably effected since the driven movement is restricted to be uniplanar.

Since micromanipulation is performed at the same time the two axes in actual selection are switched, control of complicated movement of the manipulator minute appliance is facilitated, and consequently operability of the manipulator is improved.

The foregoing and other objects and advantages will be more fully apparent from the following detailed description, which, together with the drawings, is illustrative of a preferred embodiment of the present invention, without intending to be restrictive of such modifications as might become apparent to persons skilled in this art.

DESCRIPTION OF PREFERRED EMBODIMENT

Figure 1:
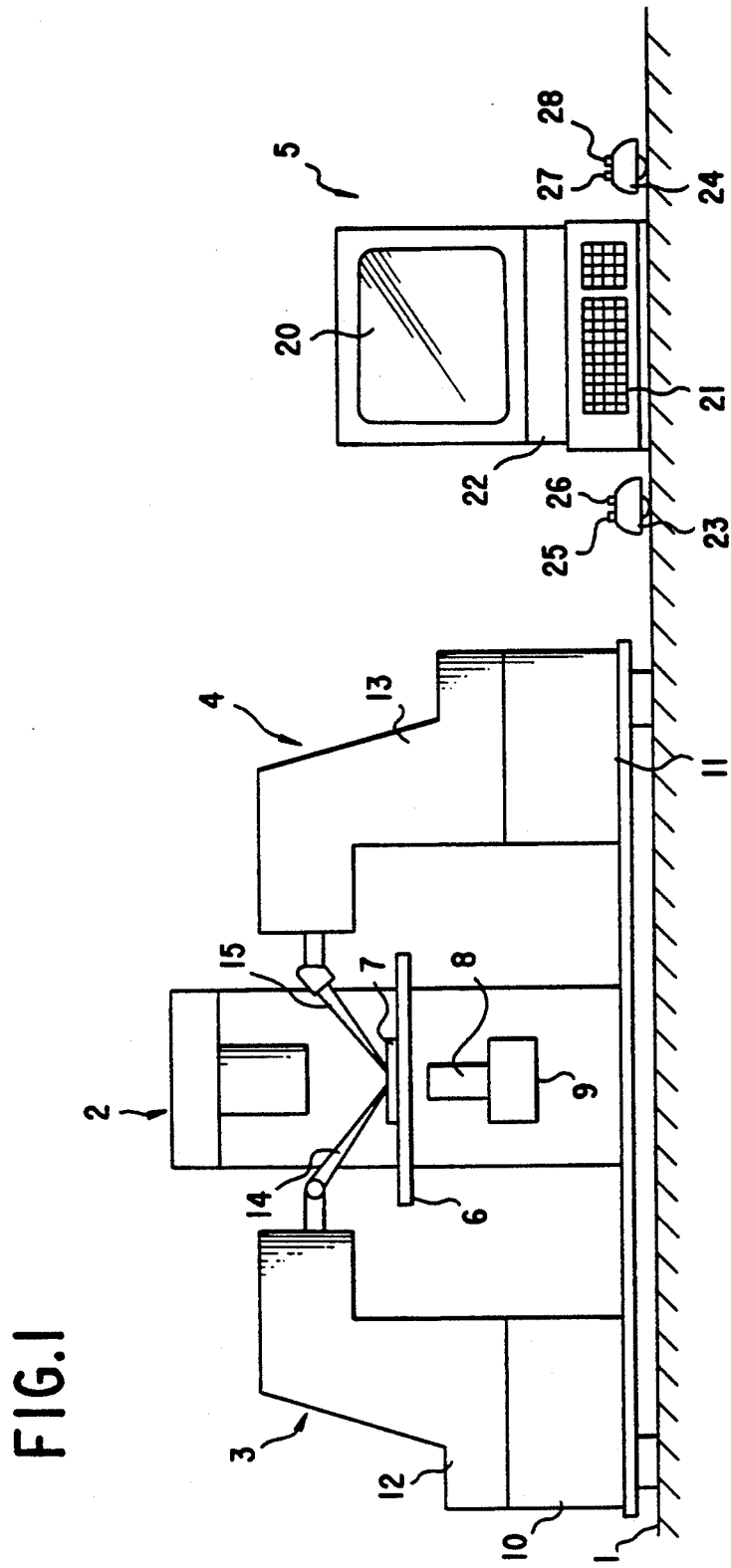
FIG. 1 is a schematic elevational view illustrating micromanipulator apparatus to which an operating apparatus of an associated operating system according to an embodiment of the present invention is applied.

FIG. 1 illustrates micromanipulator apparatus to which an operating system according to an embodiment of the present invention is applied.

Referring to FIG. 1, the micromanipulator apparatus comprises a microscope 2 placed on a base 1, a pair of micromanipulable fine instrument mechanisms 3 and 4 disposed to either side of the microscope 2, and a control station 5 for controlling operation of the microscope 2 and the fine instrument mechanisms 3 and 4.

The microscope 2 includes a centrally located stage 6. Set on the stage 6 is a sample dish on which, as an object of a treatment, a cell for example is placed. Disposed below the stage 6 are objective lenses 8. A television camera 9 is connected to a lower end of the objective lenses 8. The stage 6 is moved horizontally and vertically by a drive mechanism (not shown).

The fine instrument mechanisms 3 and 4 disposed on the base 1 comprise bottom supports 10 and 11 on which are respective drivers 12 and 13. The drivers 12 and 13 are moved by stepping motors 40, 41 and 42 (indicated in FIG. 2) in a Z-axis vertical direction, as well as in X, Y-axes horizontal directions along the bottom supports 10 and 11, respectively, by increments of unit μm in fine movement, or by several tens of μm in coarse movement. Glass capillaries 14 and 15 are articulated with respective end mounts of the drivers 12 and 13 along either side of the microscope 2. The capillaries 14 and 15 extend toward the sample dish 7.

The control station 5 comprises a CRT 20, an operation panel 21, a control unit 22, and mice 23 and 24 as illustrated in FIG. 1. The mice 23 and 24 respectively comprise click buttons (CB1) 25 and 27, and click buttons (CB2) 26 and 28. The click buttons (CB1) 25 and 27 switch between the fine and coarse movements of the drivers 12 and 13. The click buttons (CB2) 26 and 28 are used for selecting two from among the three axes, i.e., the X, Y, Z axes, in a repeating sequence of dual combinations thereof. In this case, the coarse movement is changed to the fine movement and vice-versa each time either of the click buttons 25 or 27 is pressed, and the dual combination of axes in selection are switched in the order XY→YZ→ZX→XY each time either of the click buttons 26 or 28 is pressed.

Figure 2:
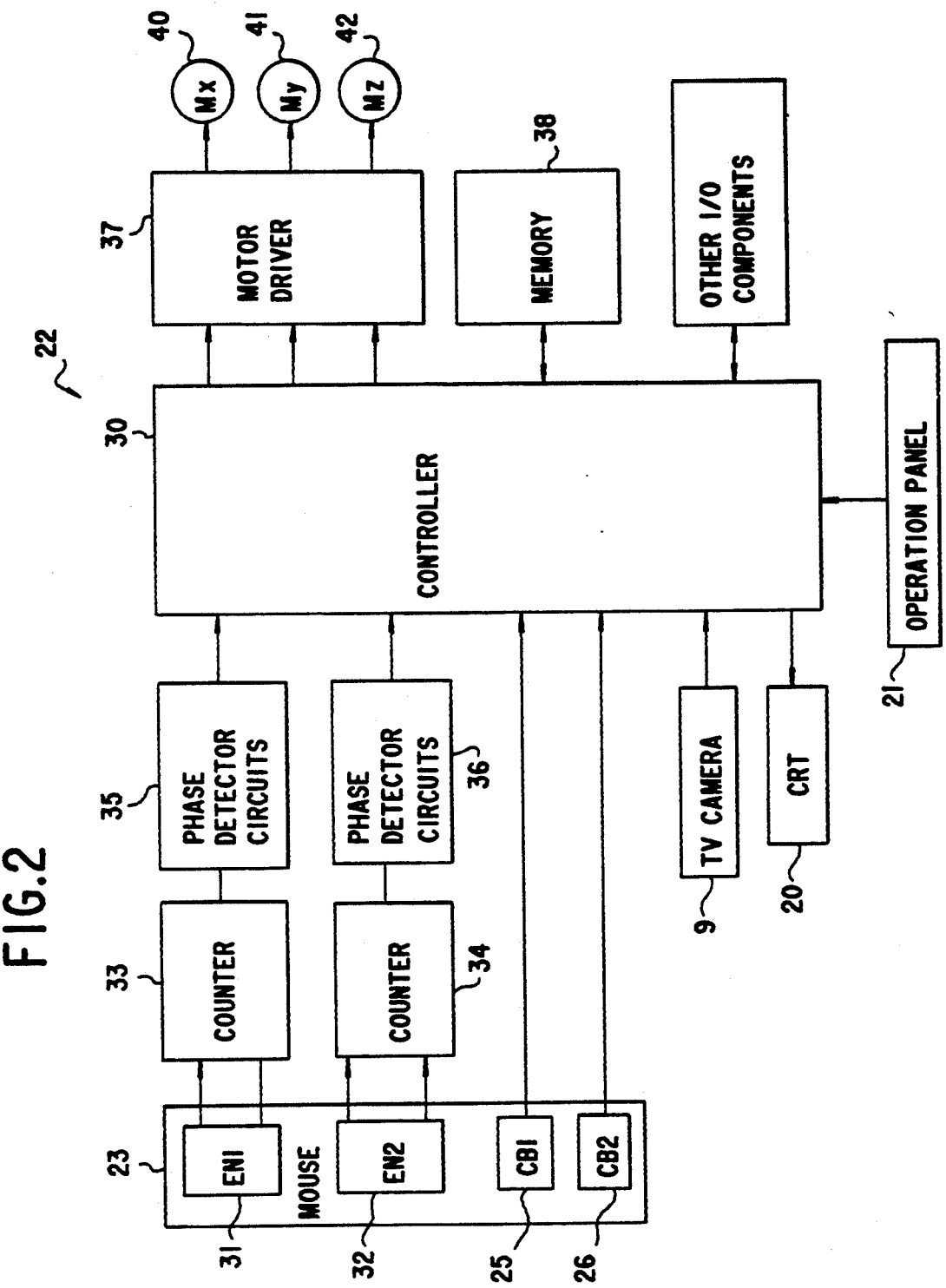
FIG. 2 is a block diagram illustrating a control unit of the operating system.
Figure 4:
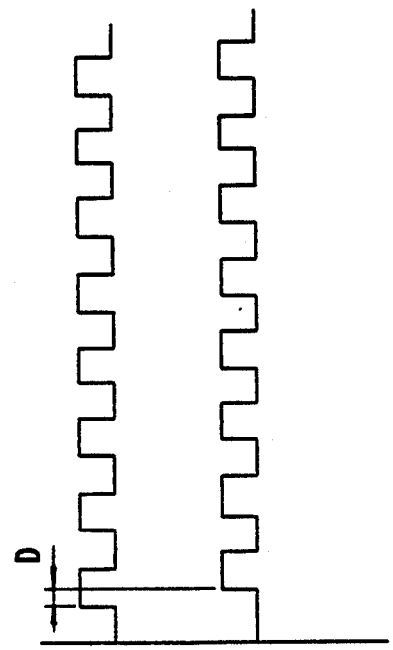
FIG. 4 is an encoder timing chart.

The mouse 23 comprises two encoders (EN1 and EN2) 31 and 32, as indicated in FIG. 2, for detecting movement in two uniplanar directions. Output from the encoders 31 and 32 is applied to respective counters 33 and 34. The encoders 31 and 32 each output a reference pulsed signal and a rotation pulsed signal corresponding to the direction of rotation, as diagramed in FIG. 4. The counters 33 and 34 tally the number of the rotation pulses, and are connected to respective phase detector circuits 35 and 36. The phase detection circuits 35 and 36 detect phase difference D between the rotation and the reference pulsed signals.

Output from the counters 33 and 34 and the result of the phase difference detection are applied to a controller 30. The controller 30 composing the control unit 22 contains a microcomputer. Output from the click buttons 25 and 26 of the mouse 23 is also applied to the controller 30. Although only one mouse 23 is indicated in FIG. 2, the other mouse 24 is structured likewise.

Connected also to the controller 30 are the television camera 9, the CRT 20, a motor driver 37 for controlling stepping motors 40, 41 and 42 corresponding to the three axes ZXY, a memory 38, the operation panel 21, and other I/O components. The memory 38 stores a control program and the selected result obtained through the click buttons 25 and 26. Connected to the motor driver 37 are the stepping motors 40, 41 and 42 ($M_x$, $M_y$, $M_z$) for tri-axially moving the driver 12. Therein, mouse 23 operates movement of fine instrument mechanism 3.

Operation of the embodiment as above will be described.

Figure 3:
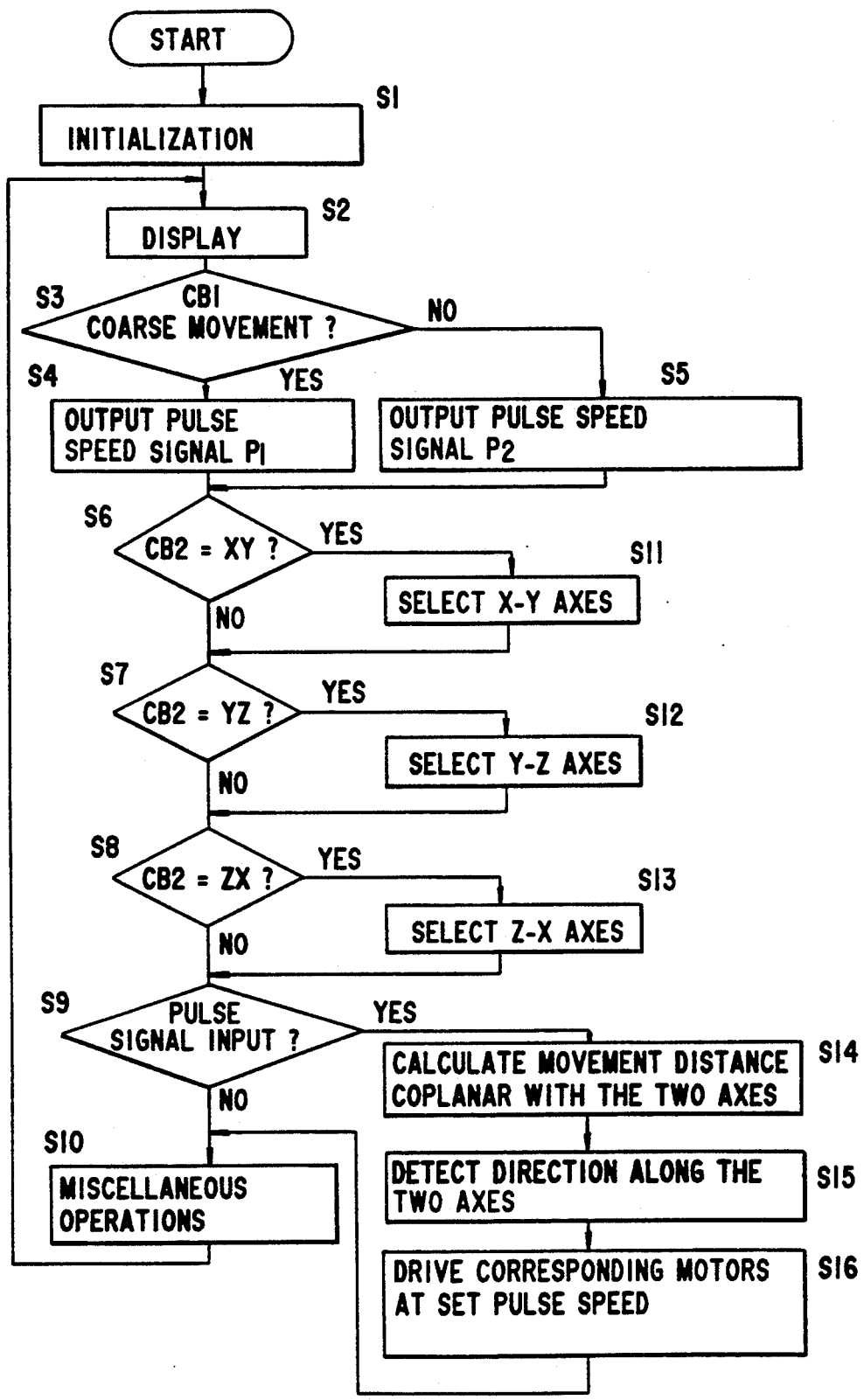
FIG. 3 is a control process flow chart of the control unit.

Referring to FIG. 3, an initialization is carried out in the controller 30 at step S1, in which, as an example, the coarse movement, and selection of the X-Y axes from among the three axes X, Y, Z is stored in the memory 38. At step S2, information obtained by the television camera 9 is displayed on the CRT 20. At step S3, it is then determined whether the coarse movement has been designated through a click of the click button 25. Since the coarse movement and the fine movement are switched over every time the click button is clicked, if the click button is pressed during the coarse movement phase, movement drive is switched to the fine movement phase, and vice-versa. Either of the resulting fine of coarse movements is displayed on the CRT 20.

Wherein it is determined that the coarse movement is designated, the program proceeds to step S4. At step S4, speed of a pulse signal output from the motor driver 37 to each of motors 40, 41 and 42 is set at $P_1$. Pulse speed $P_1$, for the coarse movement, is a high speed. Alternatively, when it is determined that the fine movement has been selected via the click button 25, the program proceeds to step S5. At step S5, the speed of pulse signal output is set at $P_2$. Pulse speed $P_2$ is for the fine movement, at a speed which is lower than the pulse speed $P_1$.

Upon setting the pulse speed at step S4 or S5, the program proceeds to step S6. It is determined at step S6 whether or not the X-Y axes are selected via the click button 26. It is determined at step S7 whether or not the Y-Z axes are selected; and it is determined at step S8 whether the Z-X axes are selected or not. Then it is determined at step S9 whether there is any input from the counters 33 and 34, and from the phase detector circuits 35 and 36, to the controller 30 through the operation of the mice 23 and 24. Miscellaneous operations are performed at step S10. Then, the program returns to step S2.

Given the determination at step S6 that the X-Y axes are selected by the click button 26, the program proceeds to step S11, wherein the selection result is stored in the memory 38 such that only the stepping motors 40 and 41 are controlled. In a similar manner, it is determined at step S7 whether the Y-Z axes, and at step S8 the Z-X axes, are selected; the program accordingly proceeds to either step S12 or S13, wherein the result is stored in the memory 38.

When it is determined at step S9 that there is a pulse input, the program proceeds to step S14. At step S14, distance to be moved in the plane through the selected two axes is calculated from the result of the counters 33 and 34 tally. Therein, the operator moves the mouse 23 in a planar trace while observing the CRT screen 20 in order to effect an analogous micromanipulation of the fine instrument/glass capillary in carrying out a desired treatment process on the microscopic object.

In this case, the movement of the mouse 23 corresponding to the two axes in actual selection is picked up by the encoders 31 and 32, whereupon the distance the mouse 23 has been moved is calculated. At step S15, the direction positive or negative along either of the selected two axes is detected through the output of the phase detection circuits 35 and 36. When the phase difference D is positive, it is determined that the analogue movement of the mouse 23 is moved in the positive direction; and conversely when the phase difference D is negative, it is determined that the movement is in the negative direction. At step S16, the stepping motors corresponding to the selected two axes are driven so as to move the driver 12 or 13 by the distance calculated at step S14 and in the direction detected at step S15. Accordingly, the drivers 12 or 13 are moved to correspond to the distance and direction designated via the mice 23 and 24.

Each of the mice 23 and 24 can be operated with one hand; and the coarse or fine phases of movement, as well as the two axes, are selected by pressing the respective click buttons 25/26, and 27/28 on the mice. In addition, uniplanar movement of the fine instrument mechanism in the plane through the selected two axes is made via an analogous single-handed planar movement of the corresponding mouse.

Figure 5A:
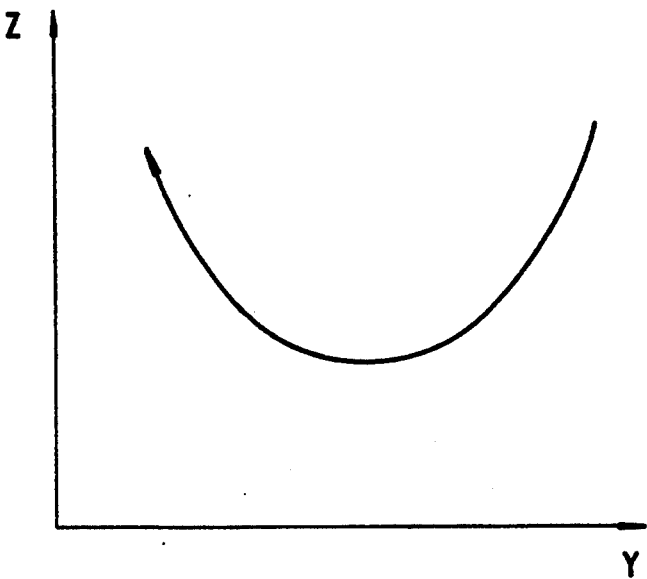
FIGS. 5(A) and (B) are graphs illustrating uniplanar manipulation analogous to operational data input.
Figure 5B:
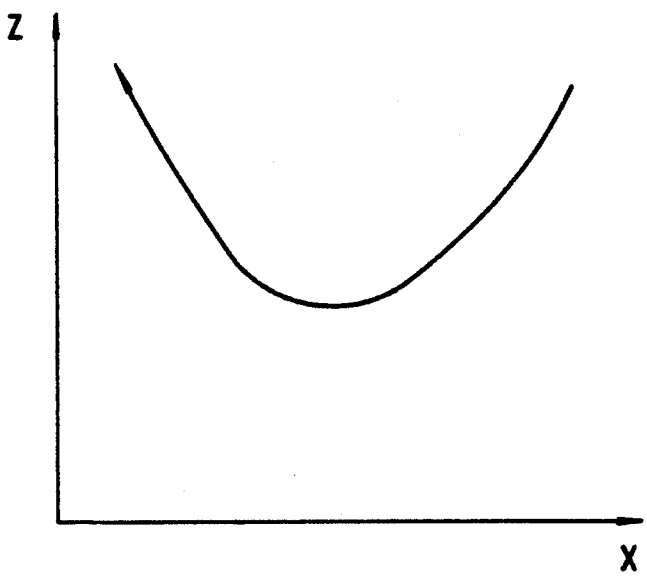

For example, a micromanipulator movement in the ZY plane as indicated by the solid line in FIG. 5(A) is implemented simply by analogously moving the mouse 23/24 along such a planar curved line as that shown. When the movement is to be made in the ZX plane from the above state, the Z-X axes are selected through operation of the click button 26/28 (at step S13) and then movement in the ZX plane as for example indicated in FIG. 5(B) can readily be made.

Accordingly, the foregoing embodiment effects movement of the micromanipulator fine instrument mechanisms which is restricted to be constantly uniplanar, yet the plane of movement being continuously switchable among three planes as defined by the three axes of motion. Stable operative control of complicated micromanipulator movements, especially in micrometer increments, is thereby facilitated to be single-handed, enabling the two micromanipulating fine instrument mechanisms to be operated by an operator using both hands to handle the pair of corresponding mice.

MODIFICATIONS (a) Besides the mouse, other means which can implement operative analogue movements in the directions of two axes simultaneously, such as a joy stick or track ball, may be used, such means being pivotal back and forth and from side to side.

(b) Although both fine and coarse movements are effected by the mice in the above embodiment of the present invention, a given mouse may be operatively used for only the fine or only the coarse phases of movement.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. For micromanipulator apparatus having fine instrument movement means movable along each of three axes within a defined space by corresponding drive means, an operating system directing uniplanar movement of the movement means, comprising:
    operational data input means for directing uniplanar movement of the movement means concerning two axes in selection from said three axes;
    axes selection means for selecting the two of said three axes thereby defining said uniplanar movement; and
    movement command means, responsive to said operational data input means and to said axes selection means, for commanding, via output to said movement means, movement in a plane through the two axes actually in selection by said axes selection means.

2. The operating system of claim 1, wherein
    said movement command means comprises control means for controlling driving operation of said drive means, according to drive data received from said operational data input means and being defined by said two axes actually in selection; and
    said operational data input means comprises means for generating said drive data via an analogue movement thereof, thereby directing correspondingly mapped uniplanar movement of the fine instrument movement means.

3. The operating system of claim 2, wherein said operational data input means comprises:
    two analog/digital converters respectively corresponding to said two axes actually in selection, for converting said analogue movement into said drive data; and
    corresponding pairs of counters for tallying said drive data, and phase detector circuits for determining direction of said analogue movement; wherein
    said drive data, and information actually selecting said two of said three axes, are output to said control means so as to control the driving operation of said drive means, and thereby to effect said uniplanar movement of said movement means.

4. The operating system of claim 3, wherein said axes selection means selects said two of said three axes in a repeating sequence of dual combinations of said three axes.

5. The operating system of claim 4, wherein said micromanipulator apparatus has an opposed, independently movable pair of said fine instrument movement means; furthermore comprising
    a pair of operating instruments corresponding to said pair of said fine instrument movement means, each comprising said operational data input means; wherein
    at least one of said pair of said operating instruments includes said axes selection means.

6. The operating system of claim 5, wherein
    said movement means is movable along each of said three axes in fine increments of unit micrometers, and coarse increments of tens of micrometers; and
    at least one of said pair of said operating instruments includes means for selecting between fine and coarse moving of said movement means.

7. The operating system of claim 6, wherein said pair of operating instruments is a pair of mouse devices.

8. The operating system of claim 6, wherein said pair of operating instruments is a pair of joy sticks.

9. The operating system of claim 6, wherein said pair of operating instruments is a pair of track balls.

10. In micromanipulator apparatus, operating apparatus for controlling movements of a fine instrument mechanism movable along each of three axes within a defined space by corresponding drivers, comprising:
    at least one operational data input device for directing uniplanar movement of said fine instrument mechanism concerning two axes in selection from said three axes;
    an axes selector switch which selects the two of said three axes thereby defining said uniplanar movement; and
    a controller responsive to said operational data input device and to said axes selector switch, for commanding said movements, including driver controllers for controlling driving operation of said drivers according to drive data received from said operational data input device and being defined by said two axes actually in selection, thereby effecting movement in a plane through the two axes selected by said axes selector.

11. The operating apparatus of claim 10, wherein said operational data input device directs, via an analogue movement thereof generating said drive data, a correspondingly mapped uniplanar movement of the fine instrument mechanism; said operational data input device comprising:

two analog/digital converters respectively corresponding to said two axes actually in selection, for converting said analogue movement into said drive data; and corresponding pairs of counters for tallying said drive data, and phase detector circuits for determining direction of said analogue movement; wherein said drive data, and information actually selecting said two of said three axes, are output to said controller accordingly to control said drivers.

12. The operating apparatus of claim 11, wherein said axes selector switch selects said two of said three axes in a repeating sequence of dual combinations of said three axes.

13. The operating apparatus of claim 11, further comprising a pair of manually workable instruments, each incorporating one of said operational data input devices, provided to correspond to an opposed, independently movable pair of the fine instrument mechanisms.

14. The operating apparatus of claim 13, wherein
said fine instrument mechanisms are movable along each of said three axes in fine increments of unit micro-meters, and coarse increments of tens of micrometers;

at least one of said pair of manually workable instruments includes a switch for selecting between fine and coarse moving of said movement means; and at least one of said pair of said manually workable instruments includes said axes selections switch.

15. The operating apparatus of claim 14, wherein said pair of manually workable instruments is a pair of mouse devices.

16. The operating system of claim 14, wherein said pair of manually workable instruments is a pair of joy sticks.

17. The operating system of claim 14, wherein said pair of manually workable instruments is a pair of track balls.

* * * * *